(12) United States Patent
Mo et al.

(10) Patent No.: US 9,351,121 B2
(45) Date of Patent: May 24, 2016

(54) PEER-BASED COLLABORATIVE DISCOVERY AND SIGNALING OF ANOTHER DEVICE IN LIMITED-SIGNAL AREAS

(75) Inventors: Stanley Mo, Hillsboro, OR (US); Tobias M. Kohlenberg, Portland, OR (US); Mubashir A. Mian, Morton Grove, IL (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,936

(22) PCT Filed: Feb. 23, 2012

(86) PCT No.: PCT/US2012/026333
§ 371 (c)(1),
(2), (4) Date: Apr. 14, 2014

(87) PCT Pub. No.: WO2013/126063
PCT Pub. Date: Aug. 29, 2013

(65) Prior Publication Data
US 2014/0221003 A1 Aug. 7, 2014

(51) Int. Cl.
*H04W 4/02* (2009.01)
*G01S 5/16* (2006.01)
(Continued)

(52) U.S. Cl.
CPC .............. *H04W 4/027* (2013.01); *G01S 5/0284* (2013.01); *G01S 5/16* (2013.01); *G01S 5/30* (2013.01); *H04W 8/22* (2013.01); *H04W 64/00* (2013.01)

(58) Field of Classification Search
CPC ....... H04W 4/027; H04W 8/22; H04W 64/00; G01S 5/16; G01S 5/30; G01S 5/0284
See application file for complete search history.

(56) References Cited

U.S. PATENT DOCUMENTS

| 6,118,789 A | 9/2000 | Wood, Jr. |
| 7,155,238 B2 | 12/2006 | Katz |

(Continued)

FOREIGN PATENT DOCUMENTS

| EP | 1441235 A2 | 7/2004 |
| EP | 2 088 750 A1 | 8/2009 |

(Continued)

OTHER PUBLICATIONS

International Search Report and Written Opinion received for PCT Patent Application No. PCT/US2012/026333, mailed on Jan. 21, 2013, 10 Pages.

(Continued)

*Primary Examiner* — Brandon Miller
(74) *Attorney, Agent, or Firm* — Grossman, Tucker, Perreault & Pfleger, PLLC (57) ABSTRACT

Generally, this disclosure describes a method and system for peer-based collaborative discovery and signaling of another device in limited signal areas. A method may include, in an embodiment, initiating a sensing mode in a seek mobile device in response to receiving an indication that a location of a lost mobile device is unknown; capturing first position data if a signal from the lost device is detected; capturing second position data in response to losing the signal from the lost device; and determining an estimated location of the lost device based on the first position data and the second position data, wherein the lost device is located in an area of limited or no connectivity and the seek device is moving through the area.

20 Claims, 6 Drawing Sheets

(51) Int. Cl.
  *G01S 5/30* (2006.01)
  *G01S 5/02* (2010.01)
  *H04W 8/22* (2009.01)
  *H04W 64/00* (2009.01)

(56) References Cited

U.S. PATENT DOCUMENTS

| | | | |
|---|---|---|---|
| 8,254,956 | B2 | 8/2012 | Lohi |
| 8,284,045 | B2 | 10/2012 | Twitchell, Jr. |
| 8,942,719 | B1 * | 1/2015 | Hyde et al. ............... 455/456.1 |
| 2003/0210142 | A1 | 11/2003 | Freathy et al. |
| 2004/0246129 | A1 | 12/2004 | Goggin |
| 2005/0079873 | A1 * | 4/2005 | Caspi et al. ............... 455/456.1 |
| 2005/0085240 | A1 | 4/2005 | Fitzgerald |
| 2007/0120698 | A1 | 5/2007 | Turk et al. |
| 2010/0102953 | A1 | 4/2010 | Chou et al. |
| 2010/0114488 | A1 * | 5/2010 | Khamharn et al. ........... 701/300 |
| 2011/0029229 | A1 | 2/2011 | Hui |
| 2011/0143778 | A1 | 6/2011 | Hwang et al. |

FOREIGN PATENT DOCUMENTS

| | | | |
|---|---|---|---|
| JP | 09138269 | A | 5/1997 |
| JP | 2006053047 | A | 2/2006 |
| JP | 2011029920 | A | 2/2011 |
| WO | 2005009020 | A1 | 1/2005 |
| WO | 2013/154588 | A1 | 10/2013 |

OTHER PUBLICATIONS

Office Action and Search Report received for Taiwan Patent Application No. 102112685, mailed on Nov. 12, 2014, 13 pages of English Translation and 13 pages of Taiwan Office Action.

Frank, et al., "A Service Architecture for Monitoring Physical Objects Using Mobile Phones" Proceedings of the 7th International Workshop on Applications and Services in Wireless Networks, ASWN, 2007, 8 pages.

Yap, et al., "MAX: HumanCentric Search of the Physical World", in Proceedings of the 3rd International Conference on Embedded Networked Sensor Systems (SENSYS ' 05), Nov. 2005, 14 pages.

International Preliminary Report on Patentability and Written Opinion received for PCT Patent Application No. PCT/US2012/033642, mailed on Oct. 23, 2014, 8 pages.

International Search Report and Written Opinion received for PCT Application No. PCT/US2012/033642, mailed on Dec. 26, 2012, 11 Pages.

International Preliminary Report on Patentability received for PCT Application No. PCT/US2012/026333, mailed on Sep. 4, 2014, 7 pages.

Office Action received for U.S. Appl. No. 13/997,198, mailed on Aug. 4, 2015, 25 pages.

Office Action received for Japanese Application No. 2014-558718, mailed on Aug. 11, 2015, 4 pages of English translation and 3 pages of Japanese Office Action.

Office Action received for Taiwan Patent Application No. 102112685, mailed on Sep. 21, 2015, 8 pages of English translation and 10 pages of Taiwan Office Action.

European Search Report received for European Application No. 12869484.1, mailed Oct. 27, 2015, 7 pages.

Office Action received for Japan Application No. 2014-558718, mailed on Mar. 29, 2016, 3 pages of English translation and 3 pages of Japanese Office Action.

* cited by examiner

Receive position data from a plurality of seek devices
302

↓

Determine a first location corresponding to first position data for each seek device
304

↓

Determine a second location corresponding to second position data for each seek device
306

↓

Generate an estimated lost device location based on the first location and second location for each seek device
308

↓

Generate a convergence region based on the plurality of estimated lost device locations
310

↓

Output convergence region data
312

PEER-BASED COLLABORATIVE DISCOVERY AND SIGNALING OF ANOTHER DEVICE IN LIMITED-SIGNAL AREAS

FIELD

This disclosure relates to discovery and signaling of another device, more particularly to peer-based collaborative discovery and signaling of another device in limited signal areas.

BACKGROUND

Mobile devices may become lost and, in some cases, may be stolen. In some situations, a lost mobile device may be in an area of no or limited connectivity to a network. With connectivity to a wireless network, for example, it may be possible to define a region that includes the lost device. Without such connectivity, it can be difficult, if not impossible, to find the lost device.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure describes a method and system for lost device discovery in limited signal areas. The method and system are configured to allow peer-based collaborative discovery and signaling of the lost device in limited signal areas. The method and system are configured to utilize a plurality of mobile devices as seek devices configured to detect a signal transmitted from the lost device. The lost device may be configured to transmit one or more signal types. Signal types include, but are not limited to, wireless signals including RFID, Bluetooth, Wi-Fi, 3G, 4G, other wireless wide area network (WWAN) signals and/or other wireless signals, audio signals, infrared signals, and/or other types of signals. Each signal type may have an associated signal range.

Each seek device is configured to activate sensor(s) in response to receiving an indication that lost device is lost. The indication may include a device identifier configured to identify the lost device. The sensor(s) may be configured to sense one or more signal types. The signal types include, but are not limited to, wireless signals, audio signals optical signals such as infrared and/or other types of signals. Each seek device is configured to capture first position data when a signal from the lost device is detected and to capture second position data when the signal from the lost device is lost. Each seek device may be configured to capture exit position data when the respective seek device regains connectivity. Whether a detected signal is from the lost device may be determined based on the lost device identifier. Position data may include, but is not limited to, time data, heading, and/or accelerometer data. Time data may include a time that the lost device signal is detected, a time that the lost device signal having been detected is lost and a time that connectivity is regained by the seek device. In some embodiments, depending on the capabilities of a seek device, the seek device may be configured to capture time, heading and/or accelerometer data at intervals from the time the lost device signal is detected to the time that connectivity is regained.

One or more of the seek device(s) may pass through an area of limited or no connectivity that includes the lost device at random, for example, through movement of the seek devices' end-users that may be unrelated to a search for the lost device. A likelihood that the seek device(s) will pass through the area and detect the lost device signal may increase with an increase in a number of seek devices participating (activated) in the search. The seek device(s) that pass through the area may further pass through a region where a signal from the lost device may be received ("signal region"). The signal region may correspond to a radiation pattern of the lost device's antenna. Location of the boundaries of the signal region relative to a location of the lost device may depend on a signal type, as described herein.

An estimated location of the lost device may be determined based on the first position data and the second position data. The estimated location may also be based on the exit data. A convergence region (zone) may then be determined based on the an estimated location provided by each of the plurality of seek devices. The convergence region is configured to enable a directed search for the lost device. A size and/or accuracy of the convergence region may be related to a number of seek devices.

For example, a first location corresponding to the first position data, a second location corresponding to the second position data and an exit location corresponding to the exit position data may be determined for each seek device. These locations may then be used to determine an estimated signal region for the lost device and an estimated center of the estimated signal region based on the detected signal type for each seek device. Each estimated center corresponds to an estimated location of the lost device. The plurality of estimated centers may then define the convergence region that may include the lost device.

It should be noted that in a region of no or limited connectivity, a seek device may not receive a location (e.g., GPS) signal. Thus, in order to determine location, the seek device may utilize other information. The seek device may regain a location signal when the seek device regains connectivity. Locations in the region of limited or no connectivity may then be determined based on the location of the seek device when it regained connectivity (and a location signal), the position data captured in the region of limited or no connectivity and the exit position data captured when connectivity was regained.

For example, for a seek device that includes a clock, a compass and accelerometers, an estimated location may be determined based on position data and exit location. In this example, position data includes time (e.g., time that a signal from lost device was detected, time that the signal was lost, and time that the seek device regained connectivity), heading(s) and change(s) in velocity. Exit location may be determined based on the location signal when the seek device regains connectivity. Exit heading may be determined based on compass data and/or location signal. Exit velocity may be determined based on location signal, e.g., change in location versus time may be utilized to determine exit velocity. Based on exit velocity, exit heading and exit location and position data including time data, heading and change in velocity data that were captured in the area of limited or no connectivity, the first location corresponding to the seek device detecting a lost device signal and the second location corresponding to the seek device losing the lost device signal may be determined. Exit velocity, exit heading and exit location provide a "final condition" that is a basis for determining location(s) in the area of limited or no connectivity based on the position data captured in the area. In other words, the exit data provides a reference for location determination based on position data since accelerometers are configured to detect a change in velocity and not an absolute velocity.

In another example, for a seek device that does not include a compass or accelerometer, but does include a clock and may include a calendar, calendar data and/or time data may be used to determine an estimated location of a lost device. In this example, position data includes time data. The seek device may be configured to capture first position data and second position data. First position data includes a time ("first time") when the seek device detects a signal from the lost device and second position data includes a time ("second time") when the signal from the lost device is lost. The seek device may be configured to capture exit data that includes a time (exit time) when the seek device regains connectivity.

Continuing with this example, the calendar may be queried to determine whether there are two consecutive calendar entries that bound the first time and the second time. If there are two such consecutive calendar entries, corresponding locations may be acquired from the calendar and a straight line may be determined that connects the two locations. An estimated location of the lost device may be a distance corresponding to a signal radius measured from this line somewhere along the line. Depending on the length of the line and the length of the signal radius, this may be sufficient for directing a search for the lost device.

A possibly more accurate estimate may be determined based on the first time data and the second time data. An ending time of the calendar entry prior to the first time (first calendar entry) and the start time of the calendar entry after the second time (second calendar entry) may be used to estimate traversal time between the location corresponding to the first calendar entry and the location corresponding to the second calendar entry. If a constant speed is assumed, a first location corresponding to the first time and a second location corresponding to the second time may be determined. An estimated location of the lost device may then be determined, as described herein.

Once the first location and second location are determined, an estimated lost device location may be determined based on the first location, the second location and the signal range (corresponding to a boundary of the signal region) of the lost device signal. The first location (when the lost device signal is detected) and the second location (when the lost device signal is lost) correspond to two points on the boundary of the signal region. If the signal region is omnidirectional then the boundary of the signal region is substantially circular. Based on the signal type, the signal range and therefore radius of the signal region may be determined. A straight line connecting two points that lie on a circle is, by definition, a chord. Given a chord and a radius, a center of a circle may be determined. However, the center is not unique. In other words, in three dimensions, an infinite number of circles may correspond to a chord and a radius. If the analysis is limited to two dimensions, then the chord and radius may correspond to two circles with the centers lying on a bisector of the chord, equidistant from the chord, on opposite sides of the chord. The distance of the center of each circle may be determined from the chord as $$L = \sqrt{R^2 + \left(\frac{C}{2}\right)^2},$$

where L is the distance from the center of the chord to the center of the circle (i.e., along the bisector of the chord), R is the radius of the (circular) signal region and C is the length of the chord. The center of the circle corresponds to the estimated location of the lost device.

If the locations could be determined without error and if the radiation pattern of the lost device antenna is truly circular, then the location of the lost device could be narrowed to two possible locations based on position data from one seek device (i.e., on a bisector of a chord a length L from the associated chord). However, in reality, there may be error in the location calculations and antenna radiation patterns may not be omnidirectional. Error due to antenna radiation pattern variation may be reduced by characterizing a shape of the radiation pattern and including such characterizations in the location determinations.

Further, if the lost device is above or below the elevation of the seek devices, depending on the magnitude of the difference, a radius of the boundary of the signal region may be smaller than assumed because of the toroidal shape of the actual antenna radiation pattern. In two dimensions, a perpendicular bisector of a chord may be utilized to determine a center of a circular antenna radiation pattern. In three dimensions, for example including changes in elevation between a seek device and the lost device, a center of the toroid may be determined based on three-dimensional location data. For example, the three-dimensional location data may define a base of a cone. A location of an apex of the cone, determined based on antenna radiation pattern, may correspond to a center of the toroid (and an estimated location of the lost device). Thus, there may be error in the estimate of the location of the lost device.

A plurality of seek devices may then yield a plurality of estimated lost device locations that are related to the actual location of the lost device but may not correspond to the exact location of the lost device. A convergence region may be generated that includes the plurality of estimated lost device locations. As the number of seek devices increases, a size of the convergence region may be reduced depending on a distribution of estimated lost device locations. In other words, a location that corresponds to a plurality of estimated locations may be nearer to the lost device than a location that corresponds to one estimated location of a plurality of estimated locations.

Assuming a toroidal radiation pattern is convenient because the geometry is relatively simple. Further, many mobile device antennas may have a generally toroidal radiation pattern. However, assuming a particular antenna radiation pattern is not a requirement of the present disclosure. For example, a first location and a second location may be determined based, at least in part, on the first position data and second position data for each seek device of a plurality of seek devices, as described herein. The plurality of first locations and plurality of second locations may then be plotted. Each of the locations corresponds to an estimated boundary point for a signal region. The estimated boundary points may then be used to generate a convergence region for use in directing a search for a lost device. A convergence region based on estimated centers of signal regions may provide a relatively smaller convergence region than a convergence region based on estimated boundary points but either or both may be used to direct a search for a lost device.

Thus, a lost device discovery system consistent with the present disclosure may utilize a plurality of seek devices to detect one or more signals emitted by a lost device in a region of low or no connectivity. Each of the seek devices may be configured to capture position data when a signal is detected, when the signal is lost and upon exiting the region (i.e., upon regaining connectivity). Estimated locations of points on boundaries of antenna radiation patterns of the lost device may be determined based on the position data for the plurality of seek devices. A convergence region may then be determined based on these estimated boundary points. A size of the convergence region may depend on signal type, number of seek devices and whether signal region boundaries or estimated location of lost device(s) are used to determine the convergence region.

Figure 1:
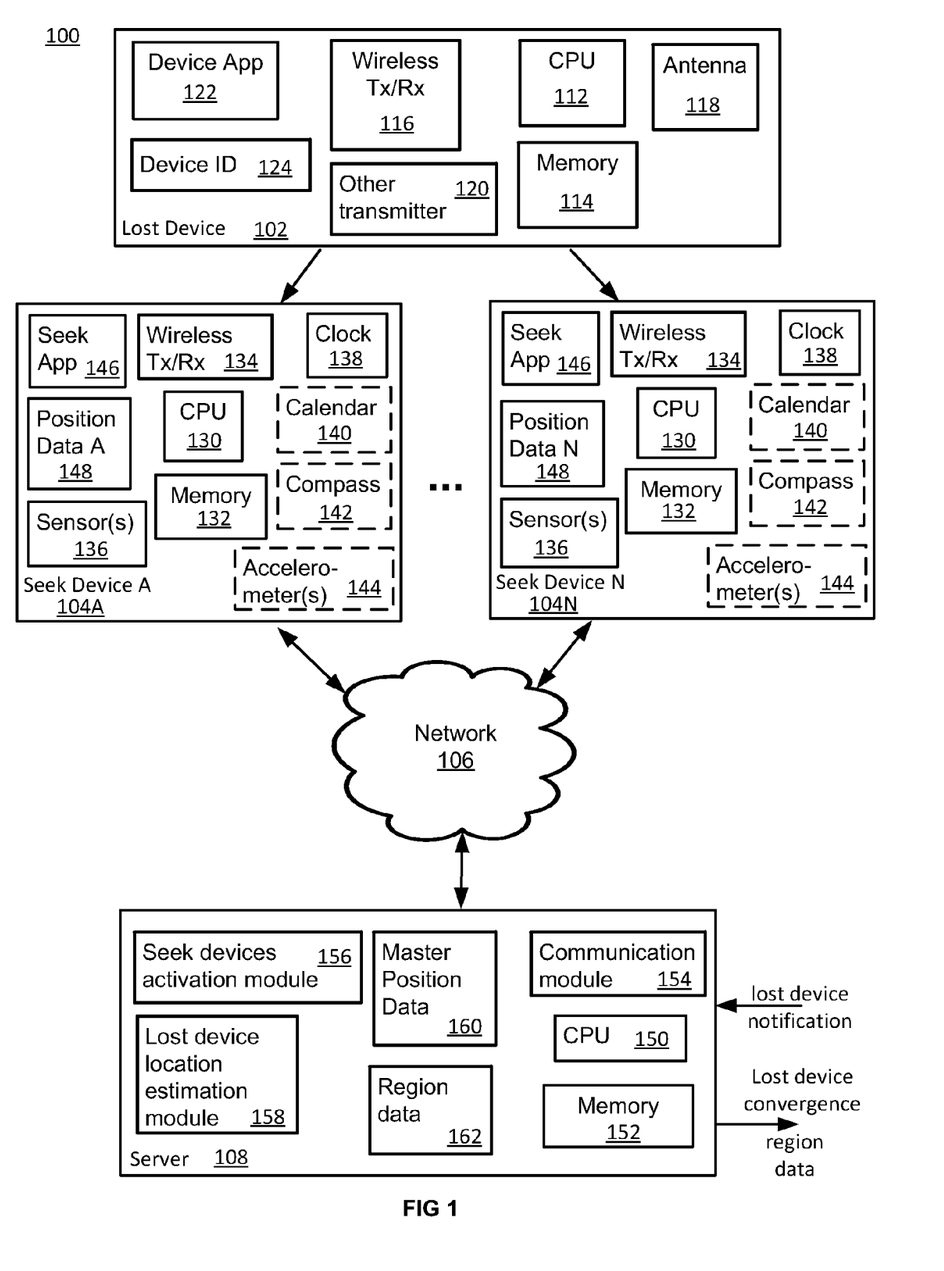
FIG. 1 illustrates a lost device discovery system consistent with various embodiments of the present disclosure.

FIG. 1 illustrates a lost device discovery system 100 consistent with various embodiments of the present disclosure. The system 100 generally includes a lost device 102, a plurality of seek devices 104A, . . . , 104N, a network 106 and a server 108. The lost device 102 and each of the plurality of seek devices 104A, . . . , 104N may each be a mobile device. "Mobile device" as used herein means any computing device, including, but not limited to, mobile telephones, smartphones, tablet computers, notebook computers, ultraportable computers, ultramobile computers, netbook computers, laptop computers, subnotebook computers, personal digital assistants, enterprise digital assistants, mobile internet devices and personal navigation devices. Network 106 may be a public network, e.g., the Internet, and is configured to provide connectivity between the seek devices 104A, . . . , 104N and server 108. The server 108 may be a dedicated server or may correspond to a web-based service processing on one or more generalized servers (e.g., cloud computing).

Lost device 102 includes at least one processor "CPU" 112, memory 114, wireless transmitter/receiver (Tx/Rx) 116 and antenna 118 and may include other transmitter(s) 120. Lost device 102 may include at least one device application ("app") 122 configured to cause wireless Tx/Rx 116 and/or other transmitter(s) 120 to transmit one or more signals of one or more signal types. Lost device 102 includes a device identifier ("ID") 124 configured to identify lost device 102. CPU 112 is configured to perform operations associated with applications and/or modules on lost device 102. Memory 114 is configured to store applications including device app 122 and/or data for lost device 102.

Wireless Tx/Rx 116 is configured to transmit and receive one or more wireless radio signals via antenna 118 that comply and/or are compatible with one or more communication protocols. Each wireless radio signal may correspond to a respective signal type. As used herein, wireless radio signal types and/or communication protocols include but are not limited to RFID (Radio frequency identification), Bluetooth, Wi-Fi, Wireless Wide Area Networks (WWAN) such as 3G and 4G and/or other communication protocols. Other transmitter(s) 120 may include a speaker configured to transmit an audio signal, an optical transmitter configured to transmit an optical (e.g., infrared) signal and/or other transmitters configured to transmit other types of signals.

Wireless Tx/Rx 116 may include and/or may be coupled to antenna 118 configured to transmit one or more signal types. The antenna 118 may have an associated radiation pattern that includes a signal region of non-zero radio signal intensity. For example, the radiation pattern may be omnidirectional. Omnidirectional corresponds to a signal region with an outer boundary that is substantially circular in a plane perpendicular to an axis of antenna 118. The signal region of an omnidirectional antenna may be viewed in three dimensions as generally toroidal with a center of the toroid corresponding to the axis of the antenna 118. A maximum radius of the signal region outer boundary is in a plane perpendicular to the axis of the antenna and bisecting the toroid. As used herein, the maximum radius of the signal region (i.e., distance from the antenna 118 to the outer boundary of the signal region) corresponds to "signal range". It should be noted that signal intensity may not be uniform within the signal region.

Each signal type may have an associated signal range. For example, the signal range for RFID is typically less than about twenty feet and the signal range for Bluetooth is typically about thirty to about fifty feet. In another example, the signal range for Wi-Fi is typically about sixty five feet to about one hundred feet. In another example, the signal range for 3G WWAN is typically about one quarter mile (one thousand three hundred twenty feet) to about one half mile (two thousand six hundred forty feet). An actual signal intensity at a particular location may depend on the environment and whether there are obstructions to the signal transmission.

Each signal range corresponds to a distance from lost device 102 to an outer boundary of the signal region. This distance may be used to determine an estimated location of lost device 102, based on the signal type, as described herein. For audio signals, the signal range depends on an intensity of the emitted sound wave and an attenuation that depends on properties of the medium in which the sound wave is traveling. Further, in order for an infrared signal to be received, there should be a line of sight between the lost device and the seek device.

Thus, lost device 102 is configured to transmit one or more signals of one or more signal types that may then be received by one or more seek devices 104A, . . . , 104N, as described herein. Each transmitted signal may include device ID 124 configured to identify a source of the transmitted signal. Each signal type may have a corresponding signal range that corresponds to an outer boundary, measured from the lost device 102, outside of which signal strength may not be detectable by seek devices 104A, . . . , 104N.

System 100 includes a plurality of seek devices 104A, . . . , 104N. While seek device 104A is described in detail, it should be noted that the description of seek device 104A applies to any of seek devices 104A, . . . , 104N. Seek device 104A includes at least one processor "CPU" 130, memory 132 and wireless transmitter/receiver (Tx/Rx) 134. CPU 130 is configured to perform operations associated with applications and/or modules on seek device 104A. Memory 114 is configured to store applications and/or data for seek device 104A. Wireless Tx/Rx 132 is configured to transmit and receive one or more wireless radio signals (of one or more signal types) that comply and/or are compatible with one or more communication protocols, as described herein.

Seek device 104A includes one or more sensor(s) 136 configured to detect one or more signal types transmitted by lost device 102. For example, sensor 136 may be a microphone configured to detect an audio signal. In another example, sensor 136 may be an infrared detector configured to detect an infrared signal transmitted by, for example, lost device 102. When activated in response to a mobile device becoming lost, wireless Tx/Rx 134 may function as a sensor configured to detect one or more wireless signals transmitted by lost device 102, as described herein. Seek device 104A includes a clock 138 configured to maintain and generate a time signal corresponding to a time for seek device 104A. The time may be included in the position data, e.g., position data A 148, captured and stored by seek device 104A and utilized to determine a location of seek device 104A, as described herein. Seek device 104A includes a seek app 146 configured to perform operations associated with sensing one or more signal types transmitted by lost device 102, as described herein. Seek app 146 is further configured to initiate sensing mode and to capture position data in response to receiving an indication that lost device 102 is lost. For example, the plurality of seek devices may be recruited based on a request via a social networking service (opt in) or based on membership in a remote service (e.g., via subscription). The indication may include a lost device identifier, for example, device ID 124.

In some embodiments, seek device 104A may include a calendar 140 and/or a compass 142 and one or more accelerometer(s) 144. The calendar 140 is configured to store a schedule of the end-user of seek device 104A. The calendar 140 may be used to determine a location of seek device 104A at a time as indicated by data stored in calendar 140, as described herein. The compass 142 is configured to provide heading data for seek device 104A. Seek device 104A may be configured to capture heading data based on whether seek device 104A has detected a signal from lost device 102. Heading data may be included in seek device 104A position data and may be utilized to determine a location of seek device 104A. The accelerometer(s) 144 are configured to detect a change in velocity (speed and direction) of seek device 104A. For example, accelerometer(s) 144 may include three accelerometers configured to detect changes in velocity in three mutually perpendicular axes. Accelerometer data may be included in seek device 104A position data and may be utilized to determine a location of seek device 104A.

Server 108 includes at least one processor CPU 150, a memory 152 and a communication module 154. CPU 150 is configured to perform operations associated with applications and/or modules stored in server 108. Memory 152 is configured to store applications and/or data for server 108. Communication module 154 is configured communicate with one or more seek device(s) 104A, . . . , 104N via network 106 using one or more communication protocols as described herein.

Server 108 includes a seek devices activation module 156, a lost device location estimation module 158, master position data 160 and region data 162. Seek devices activation module 156 is configured to receive an indication (notification) that lost device 102 is lost (or stolen). The notification that lost device 102 is lost may include lost device ID 124. For example, notification that lost device 102 is lost may be provided by the end-user of lost device 102. In another example, notification that lost device 102 is lost may be provided by a notification service configured to maintain a database of mobile devices, to receive an indication that a mobile device is lost and to provide a notification to server 108.

Lost device location estimation module 158 is configured to determine a convergence region that includes one or more estimated locations of lost device 102. Server 108 is configured to receive respective position data from each seek device 104A, . . . , 104N and to store the received respective position data in master position data store 160. Lost device location estimation module 158 is configured to determine a respective estimated lost device location corresponding to the respective position data for each seek device 104A, . . . , 104N. Lost device location estimation module 158 is further configured to determine the convergence region based on the plurality of estimated lost device locations and to store convergence region data in region data store 162. The convergence region data may then be provided to the end-user of lost device 102 and/or to the notification service.

Thus, a lost device discovery system consistent with the present disclosure is configured to notify a plurality of seek devices 104A, . . . , 104N that lost device 102 is lost. The notification is configured to include device ID 124, configured to allow each seek device 104A, . . . , 104N to differentiate lost device 102 from other devices. Each seek device 104A, . . . , 104N is configured to activate one or more sensors (e.g., wireless Tx/Rx 134 and/or sensor(s) 136) configured to detect one or more signal(s) from lost device 102. Each seek device 104A, . . . , 104N is configured to capture first position data if a signal including device identifier 124 is detected from lost device 102. Each seek device 104A, . . . , 104N is further configured to capture second position data when the signal from lost device 102 is lost and to capture exit position data when connectivity is regained. The position data includes time and may include heading data from, e.g., compass 142 and change in velocity data from accelerometer(s) 144. The position data may then be utilized to determine a location associated with each position. The locations may then be used to determine a respective estimated location of lost device 102 for each seek device 104A, . . . , 104N as described herein. The plurality of estimated locations of lost device 102 may then be used to determine a convergence region that includes the plurality of estimated locations of lost device 102. A size of the convergence region may depend on a number of seek devices, signal type (i.e., signal radius) and/or accuracy in determining estimated locations of lost device 102. The convergence region may then be used to direct a search for lost device 102.

Figure 2:
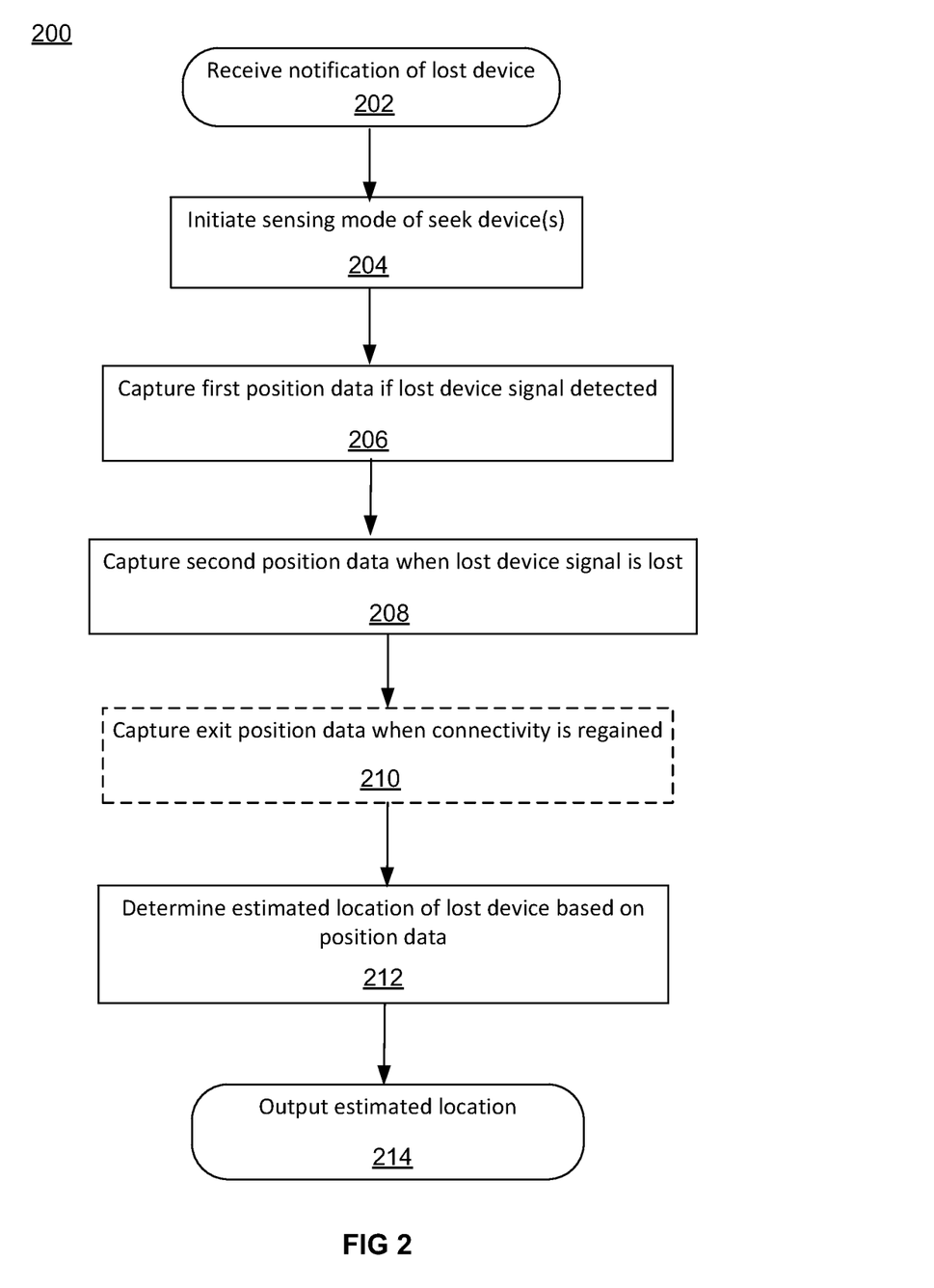
FIG. 2 illustrates a flow chart of exemplary operations of a lost device discovery system consistent with various embodiments of the present disclosure.

FIG. 2 illustrates a flow chart 200 of exemplary operations of a lost device discovery system consistent with various embodiments of the present disclosure. The operations of flow chart 200 may be performed by a seek device, e.g., seek device 104A, a plurality of seek devices, e.g., seek devices 104A, . . . , 104N, and/or a server, e.g., server 108. In particular, flow chart 200 depicts exemplary operations configured to determine an estimated lost device location based on position data captured by a seek device, consistent with the present disclosure. The operations of flow chart 200 may begin 202 with notification that a mobile device is lost. A sensing mode of one or more of a plurality of seek device(s) may be initiated at operation 204. Operation 206 includes capturing first position data if a lost device signal is detected. Respective first position data may be captured by each seek device that detects the lost device signal. Operation 208 included capturing second position data when the lost device signal is lost. Respective second position data may be captured by each seek device that detected the lost device signal. Operation 210 may include capturing exit position data when connectivity is regained. Each seek device may capture respective exit position data. An estimated location of the lost device may be determined based on position data at operation 212. The estimated location of the lost device, for each seek device, may be output at operation 214. The estimated locations may be utilized to determine a convergence region.

Figure 3:
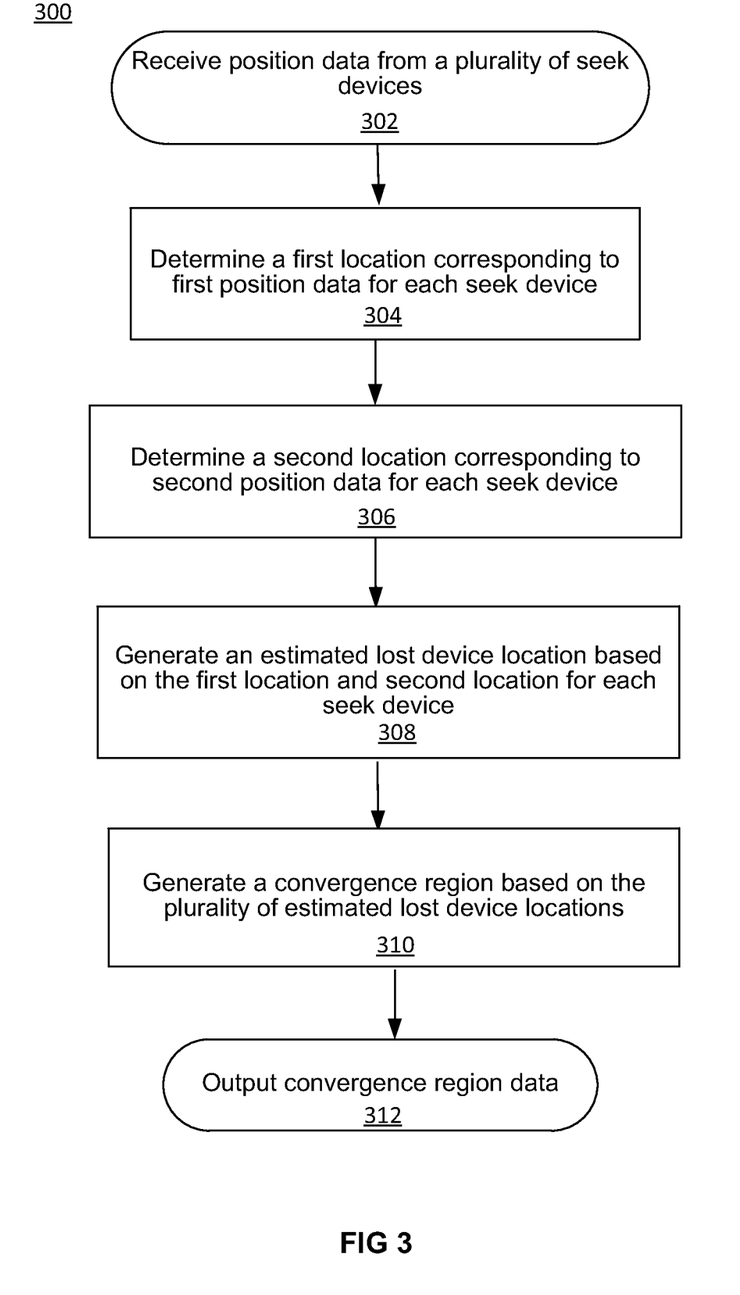
FIG. 3 illustrates a flowchart of exemplary operations configured for determination of a convergence region that may include the lost device consistent with an embodiment of the present disclosure.

FIG. 3 illustrates a flowchart 300 of exemplary operations for determining a convergence region consistent with an embodiment of the present disclosure. The operations of flow chart 300 may be performed by a seek device, e.g., seek device 104A, a plurality of seek devices, e.g., seek devices 104A, . . . , 104N and/or a server 108. In particular, flowchart 300 depicts exemplary operations configured to provide a convergence region that includes one or more estimated locations of a lost device, e.g., lost device 102, based on at least one signal from the lost device and position data from one or more seeking device(s). The operations of flowchart 300 may begin 302 with receiving position data from at least one seek device. Operation 304 may include determining a first location corresponding to first position data for each seek device. A second location corresponding to second position data may be determined for each seek device at operation 306. Operation 308 may include generating an estimated lost device location based on the first location and the second location for each seek device. A convergence region may be generated based on the plurality of estimated lost device locations at operation 310. Program flow may end with outputting convergence region data at operation 312.

Thus, an estimated lost device location may be determined based on first position data, second position data and exit position data for at least one seek device. A convergence region may then be determined based on the estimated lost device location(s). The convergence region may then be used to direct a search for the lost device.

Figure 4:
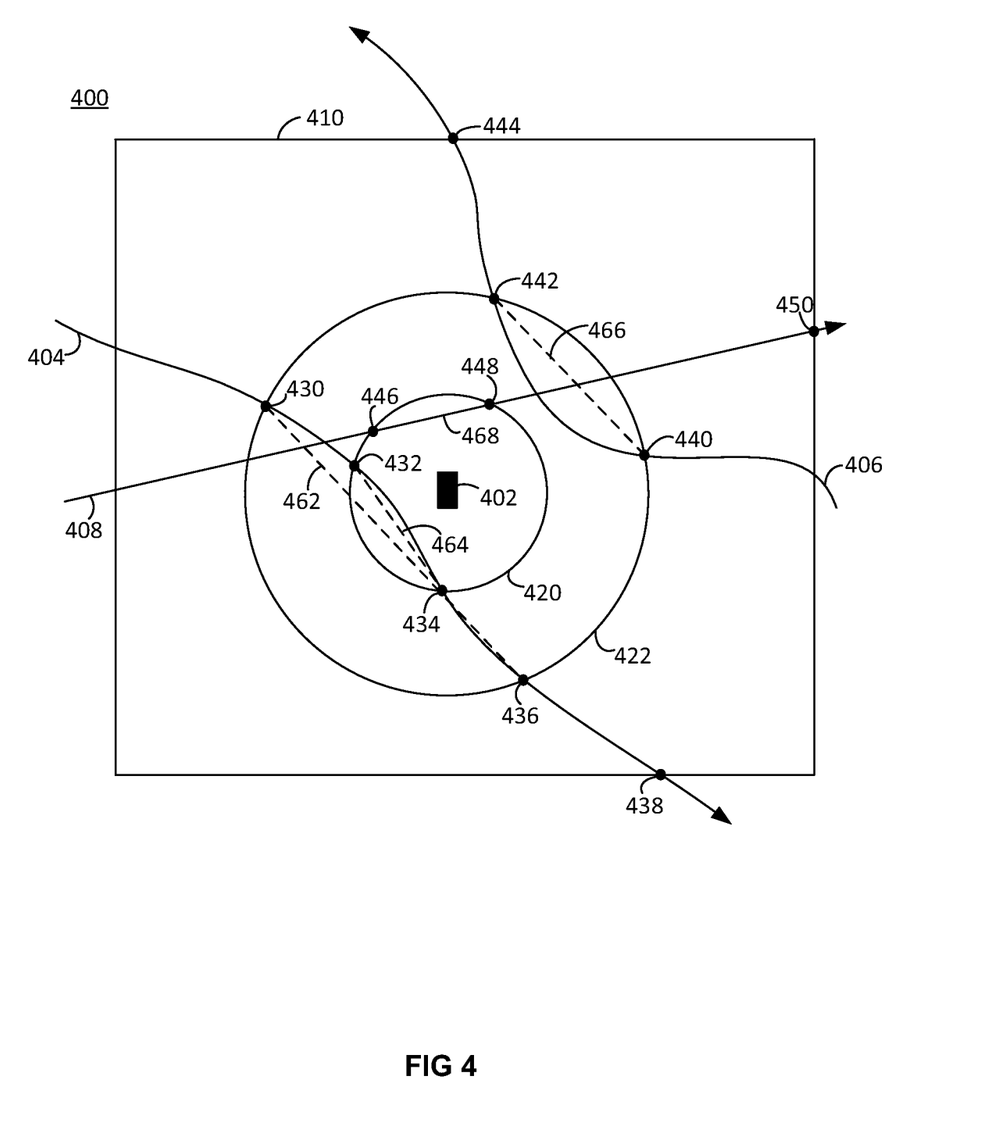
FIG. 4 illustrates one example of a lost device, a plurality of seek device paths and associated locations consistent with the present disclosure.

FIG. 4 illustrates one example 400 of a lost device 402 in a region 410 of low or no connectivity and a plurality of seek device paths 404, 406, 408 consistent with the present disclosure. Arrows on the seek paths 404, 406, 408 indicate a direction of travel of a respective seek device through region 410. In this example, lost device 402 is emitting a first signal with a corresponding first signal region 420 and a second signal with a corresponding second signal region 422. For example, the first signal may be a Bluetooth signal and the second signal may be a Wi-Fi signal.

A first seek device that traversed first path 404 encountered Wi-Fi signal region 422 at a first location 430, detected the Wi-Fi signal and captured first position data corresponding to first location 430. The first seek device encountered Bluetooth signal region 420 at a third location 432, detected the Bluetooth signal and captured third position data corresponding to third location 432. The first seek device lost the Bluetooth signal at fourth location 434 and captured fourth position data corresponding to fourth location 434. The first seek device lost the Wi-Fi signal at second location 436 and captured Wi-Fi signal data corresponding to second location 436. The first seek device exited region 410, captured exit position data and regained connectivity at exit location 438.

Thus, the first seek device's traversal of region 410 yielded position data corresponding to the Bluetooth signal region, signal data corresponding to the Wi-Fi signal region and exit position data. For example, the position data may include time (e.g., when the Bluetooth and Wi-Fi signals were detected and when the Bluetooth and Wi-Fi signals were lost), and may include heading and/or accelerometer data (i.e., change in velocity).

Similarly, a second seek device traversing the second path 406 yields respective first position data corresponding to a first location 440 when the second seek device detected the Wi-Fi signal, second position data corresponding to a second location 442 when the second seek device lost the Wi-Fi signal and exit position data corresponding to exit location 444 when the second seek device regained connectivity. In this example, the second seek device did not encounter the Bluetooth signal region.

The third path 408 corresponds to a seek device (third seek device) of limited functionality, i.e., without a compass and without accelerometers. The third seek device includes a clock and a calendar. The third path 408 may be determined based on data in the calendar. The third seek device may capture first position data that includes a time corresponding to a first location 446 where the third seek device detected the Bluetooth signal. The third seek device may capture second position data that also includes a time corresponding to a second location 448 where the third seek device lost the Bluetooth signal and may capture exit position data that includes a time corresponding to an exit location 450 where the third seek device regained connectivity. In this example, the third seek device may not be configured to detect Wi-Fi or lost device may not be emitting a Wi-Fi signal when the third seek device was within signal range.

Example 400 further includes lines (chords) drawn between the respective first location and second location corresponding to the path of each seek device through region 410. A first chord 462 corresponds to the first path 404 and Wi-Fi signal region 422. A second chord 464 corresponds to the first path 404 and the Bluetooth signal region 420. A third chord 466 corresponds to the second path 406 and the Wi-Fi signal region 422 and a fourth chord 468 corresponds to the third path 408 and the Bluetooth signal region 420. Thus, the locations of the chords 462, 464, 466, 468 depend on the first location and the second location for each path and signal region and may be determined based on position data and exit location, as described herein.

Thus, FIG. 4 illustrates one example 400 of a plurality of paths 404, 406, 408 of a plurality of seek devices through a region of limited or no connectivity that includes a lost device 402 that is transmitting a first (Bluetooth) signal and a second (Wi-Fi) signal. Each of the plurality of seek devices is configured to capture first position data when the respective seek device detects the first signal (that includes the lost device identifier), to capture second position data when the respective seek device loses the first signal and may be configured to capture exit position data when the respective seek device regains connectivity. It should be noted that although signal boundaries of the first signal region 420 and the second signal region 422 are included in FIG. 4 for illustration, in operation the locations are not known and may be determined (estimated) based on the position data and characteristics of the signals emitted by the lost device.

Figure 5:
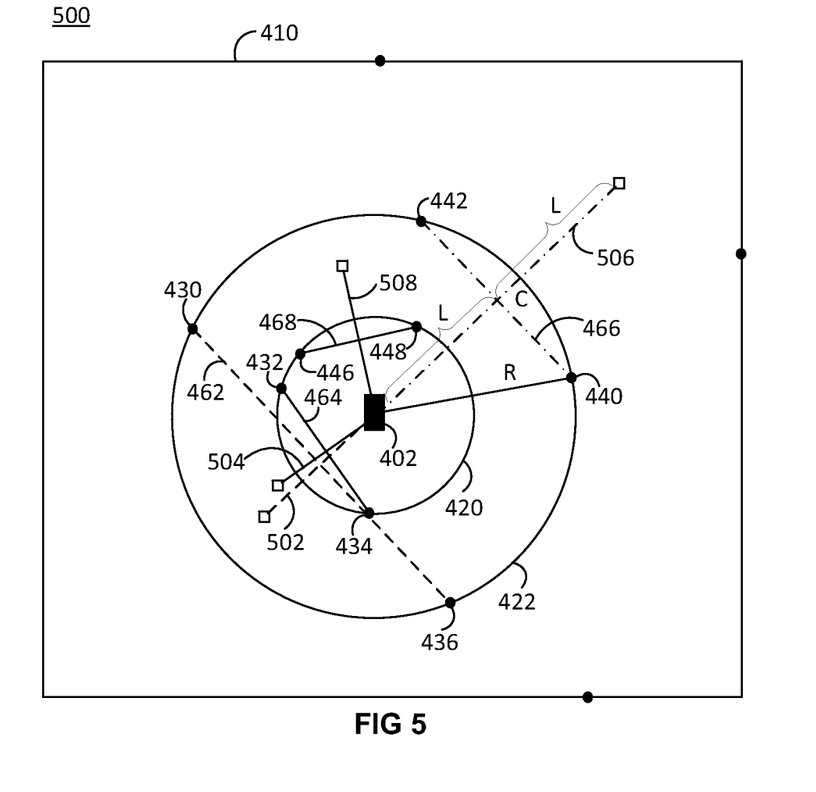
FIG. 5 illustrates one example of a convergence zone determination for the example of FIG. 4 consistent with an embodiment of the present disclosure.

FIG. 5 illustrates one example 500 of a convergence zone determination for the example of FIG. 4 consistent with an embodiment of the present disclosure. The example 500 illustrates determining one of two possible estimated locations of lost device 402 based on position data, possibly exit location and signal type for each seek device. In this example, bisector analysis is used to determine estimated lost device locations based on position data. Chord 466 corresponding to the second (Wi-Fi) signal region is used as in illustrative example. A length C of chord 466 may be determined based on a first location 440 and a second location 442 of the second seek device path. A perpendicular bisector 506 may then be determined for chord 466. A length L of the perpendicular bisector 506 from chord 466 to a center of second signal region 422 may then be determined as $$L = \sqrt{R^2 + \left(\frac{C}{2}\right)^2}.$$

R is the radius of the second signal area and corresponds to signal range. The center of the signal region may then correspond to an estimated location of lost device.

Thus, an estimated location of the lost device 402, corresponding to a center of region 422 may be determined. It should be noted that the calculation of a center based on a chord and perpendicular bisector yields two possible locations (in a plane). If position data from only one seek device is used, then two possible search locations result. If position data from multiple seek devices is used, then a convergence region may include approximately half of the estimated device locations with approximately half as outliers. Thus, the estimated lost device locations and the convergence region of example 500 correspond to the actual location of lost device 402. Example 500 may be considered an ideal example with circular signal regions and no error in determining locations where seek devices encounter signal boundaries.

Figure 6:
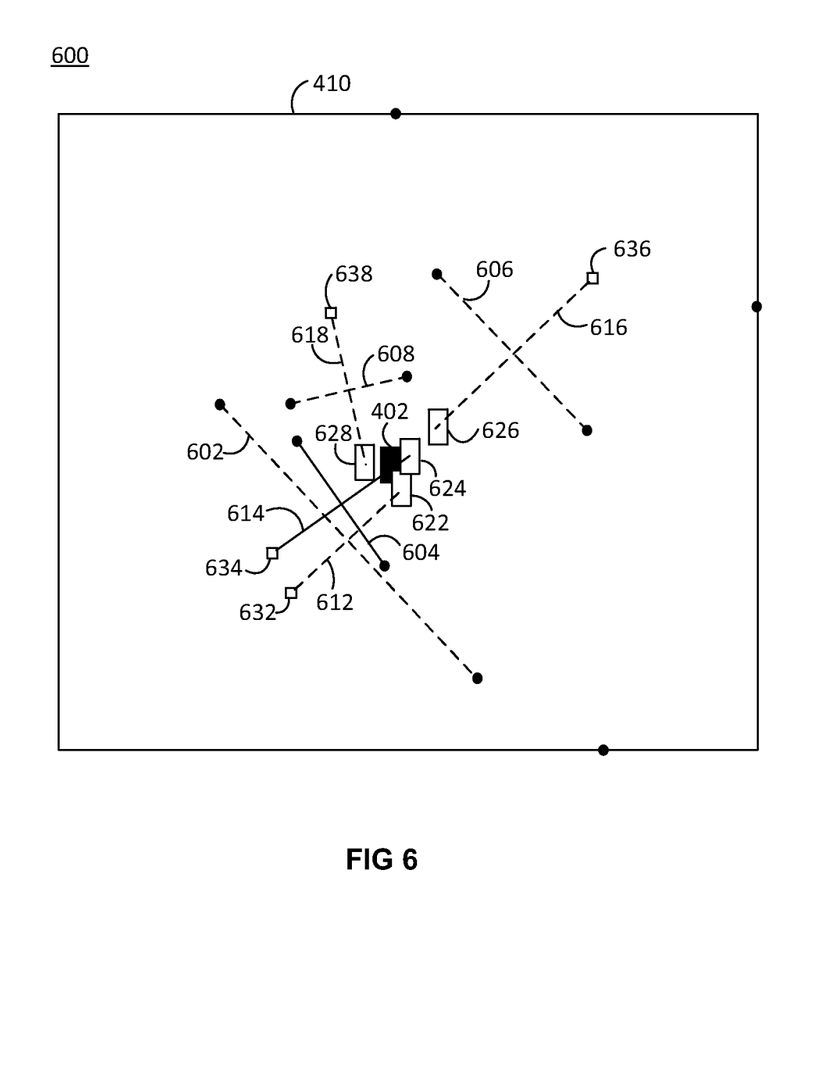
FIG. 6 illustrates another example of a convergence zone determination for the example of FIG. 4 consistent with an embodiment of the present disclosure.

FIG. 6 illustrates another example 600 of convergence zone determination for the example of FIG. 4, consistent with an embodiment of the present disclosure. Example 600 illustrates a convergence zone determination with uncertainty in first and second location determinations and without the "actual" signal zones illustrated. It should be noted that in determining estimated lost device location(s), signal zone boundaries may not be explicitly known since they are centered on the actual location of the lost device and the actual location of the lost device is not known. Differences in elevation between the lost device and the seek device(s) may further contribute to uncertainty in location determinations.

Example 600 includes chords 602, 604, 606 and 608. Chords 602 and 604 correspond to the first seek device path 404 of FIG. 4. Chord 602 corresponds to chord 462 and chord 604 corresponds to chord 464 of example 400. Chord 606 corresponds to the second seek device path 406 of FIG. 4 and chord 608 corresponds to the third seek device path 408 of FIG. 4. Chord 606 corresponds to chord 466 and chord 608 corresponds to chord 468 of example 400. Similarly, chords 604 and 608 correspond to a detected signal of the first signal type (e.g., Bluetooth) and chords 602 and 606 correspond to a detected signal of the second signal type (e.g., Wi-Fi). A range of the Bluetooth signal (e.g., about 30 to about 50 feet) is less than a range of the Wi-Fi signal (e.g., about 65 to about 100 feet). The locations of chords 602, 604, 606 and 608 have been determined based on position data when the lost device signal is detected, position data when the lost device signal is lost. The locations of chords 602, 604 and 608 may have been determined further based on exit position data and exit location for each seek device and signal type encountered, as described herein. Associated bisectors 612, 614, 616 and 618, respectively, have been determined based on chord length and signal type for each seek device and signal type detected, as described herein. The associated bisectors 612, 614, 616 and 618, each yield two possible estimated locations for lost device 402. Outlier estimated locations 632, 634, 636 and 638 may be eliminated as being greater than a predetermined distance from each other estimated location. Estimated locations 622, 624, 626 and 628 may be used to define a convergence region as each may be within the predetermined distance. As a result, the convergence region may be used to direct a search for lost device 402.

Thus, example 600 illustrates a plurality of estimated lost device locations that may be used to generate a convergence region that includes lost device 402. The effects of individual uncertainty may be lessened as the number of seek devices is increased.

In this manner, through the collaboration of a plurality of seek devices, a likelihood of finding a lost device that is lost in a region of limited or no connectivity may be increased. One or more of the seek device(s) may detect one or more signals from the lost device as the seek devices change locations according to the movements of their respective end-users. Each seek device may be configured to capture position data when the lost device signal is detected, when the lost device signal is lost and when the seek device regains connectivity. The position data and exit location data may be used to determine locations where the lost device signals were detected and lost. These determined locations and signal type may then be used to determine an estimated location of the lost device. A plurality of such estimated locations may be combined into a convergence region. The convergence region may then be used to direct a search for the lost device. Such a search may benefit from the determination of the convergence region by providing direction for the search to a bounded region.

While FIGS. 2 and 3 illustrate various operations according to one embodiment, it is to be understood that not all of the operations depicted in FIGS. 2 and 3 are necessary for other embodiments. Indeed, it is fully contemplated herein that in other embodiments of the present disclosure, the operations depicted in FIGS. 2 and 3 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

While the foregoing is prided as exemplary system architectures and methodologies, modifications to the present disclosure are possible. For example, memory, e.g., lost device memory 114, seek device memory 132 and/or server memory 152 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, lost device memory 114, seek device memory 132 and/or server memory 152 and/or may comprise other and/or later-developed types of computer-readable memory.

Lost device 102 and/or seek devices 104A, . . . , 104N may be configured to communicate with network 106 and/or server 108 using a variety of communication protocols. The communications protocols may include but are not limited to wireless communications protocols, such as Wi-Fi, Bluetooth, 3G, 4G, RFID, NFC and/or other communication protocols. The communications protocols may comply and/or be compatible with other related Internet Engineering Task Force (IETF) standards.

The Wi-Fi protocol may comply or be compatible with the 802.11 standards published by the Institute of Electrical and Electronics Engineers (IEEE), titled "IEEE 802.11-2007 Standard, IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications" published, Mar. 8, 2007, and/or later versions of this standard.

The NFC and/or RFID communication signal and/or protocol may comply or be compatible with one or more NFC and/or RFID standards published by the International Standards Organization (ISO) and/or the International Electrotechnical Commission (IEC), including ISO/IEC 14443, titled: Identification cards—Contactless integrated circuit cards—Proximity cards, published in 2008; ISO/IEC 15693: Identification cards—Contactless integrated circuit cards—Vicinity cards, published in 2006; ISO/IEC 18000, titled: Information technology—Radio frequency identification for item management, published in 2008; and/or ISO/IEC 18092, titled: Information technology—Telecommunications and information exchange between systems—Near Field Communication—Interface and Protocol, published in 2004; and/or related and/or later versions of these standards.

The Bluetooth protocol may comply or be compatible with the 802.15.1 standard published by the IEEE, titled "IEEE 802.15.1-2005 standard, IEEE Standard for Information technology—Telecommunications and information exchange between systems—Local and metropolitan area networks—Specific requirements Part 15.1: Wireless Medium Access Control (MAC) and Physical Layer (PHY) Specifications for Wireless Personal Area Networks (W Pans)", published in 2005, and/or later versions of this standard.

The 3G protocol may comply or be compatible with the International Mobile Telecommunications (IMT) standard published by the International Telecommunication Union (ITU), titled "IMT-2000", published in 2000, and/or later versions of this standard. The 4G protocol may comply or be compatible with IMT standard published by the ITU, titled "IMT-Advanced", published in 2008, and/or later versions of this standard.

Seek devices 104A, . . . , 104N may be capable of communicating with a network 106 and/or server 108 using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, seek device(s) 104A, . . . , 104N may be capable of communicating with a network 106 and/or server 108 using an X.25 communications protocol. The X.25 communications protocol may comply or be compatible with a standard promulgated by the International Telecommunication Union-Telecommunication Standardization Sector (ITU-T). Alternatively or additionally, seek devices 104A, . . . , 104N may be capable of communicating with a network 106 and/or server 108 using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, seek devices 104A, . . . , 104N may be capable of communicating with a network 106 and/or server 108 using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

"Circuitry", as used in any embodiment herein, may comprise, for example, singly or in any combination, hardwired circuitry, programmable circuitry, state machine circuitry, and/or firmware that stores instructions executed by programmable circuitry. An application ("app") and/or module, as used in any embodiment herein, may be embodied as circuitry. The circuitry may be embodied as an integrated circuit, such as an integrated circuit chip.

Thus, the present disclosure provides a method and system for lost device discovery using a plurality of seek devices when the lost device is in an area of limited or not connectivity. The method and system are configured to allow peer-based collaborative discovery and detection of the lost device in the limited connectivity area. The method and system are configured to utilize one or more mobile devices as seek devices configured to detect a signal transmitted from the lost device. The seek device(s) may capture position data that may then be used to determine estimated location(s) of the lost device. The estimated location(s) may then be used to define a convergence region. The convergence region may then be used to direct a search for the lost device, with the search limited to the convergence region.

According to one aspect there is provided a method. The method may include initiating a sensing mode in a seek mobile device in response to receiving an indication that a location of a lost mobile device is unknown; capturing first position data if a signal from the lost device is detected; capturing second position data in response to losing the signal from the lost device; and determining an estimated location of the lost device based on the first position data and the second position data, wherein the lost device is located in an area of limited or no connectivity and the seek device is moving through the area.

According to another aspect there is provided a system. The system may include a seek mobile device configured to initiate a sensing mode in response to receiving an indication that a location of a lost mobile device is unknown, capture first position data if a signal from the lost device is detected, and capture second position data in response to losing the signal from the lost device. The system may further include a server wherein at least one of the server and the seek mobile device is configured to determine an estimated location of the lost device based on the first position data and the second position data, wherein the lost device is located in an area of limited or no connectivity and the seek device is moving through the area.

According to another aspect there is provided a system. The system may include one or more storage mediums having stored thereon, individually or in combination, instructions that when executed by one or more processors result in the following operations including: initiating a sensing mode in a seek mobile device in response to receiving an indication that a location of a lost mobile device is unknown; capturing first position data if a signal from the lost device is detected; capturing second position data in response to losing the signal from the lost device; and determining an estimated location of the lost device based on the first position data and the second position data, wherein the lost device is located in an area of limited or no connectivity and the seek device is moving through the area.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising: initiating a sensing mode in a seek mobile device in response to receiving an indication that a location of a lost mobile device is unknown; capturing, by said seek mobile device, first position data if a signal from the lost device is detected, capturing, by said seek mobile device, second position data in response to losing the signal from the lost device; and determining, by said seek device, an estimated location of the lost device based on the first position data and the second position data, wherein the lost device is located in an area of limited or no connectivity and the seek device is moving through the area.

2. The method of claim 1, further comprising:
determining a convergence region that includes the estimated location of the lost device wherein the convergence region is configured to be used to direct a search for the lost device.

3. The method of claim 1, further comprising:
capturing exit position data in response to regaining connectivity.

4. The method of claim 1, further comprising:
determining an exit location of the seek device based on a location signal, in response to regaining connectivity.

5. The method of claim 1, further comprising:
determining a first location based on the first position data;
determining a second location based on the second position data,
wherein the estimated location is related to the first location and the second location.

6. The method of claim 5, further comprising:
determining a perpendicular bisector of a line connecting the first location and the second location, wherein the estimated location lies on the perpendicular bisector a distance from the line and the distance is determined based on a signal range of the signal from the lost device.

7. The method of claim 1, wherein the position data comprises at least one of time data, heading and change in velocity.

8. A system, comprising:
a seek mobile device configured to:
initiate a sensing mode in response to receiving an indication that a location of a lost mobile device is unknown,
capture first position data if a signal from the lost device is detected, and
capture second position data in response to losing the signal from the lost device; and
a server wherein at least one of the server and the seek mobile device is configured to determine an estimated location of the lost device based on the first position data and the second position data,
wherein the lost device is located in an area of limited or no connectivity and the seek device is moving through the area.

9. The system of claim 8, wherein the server is further configured to determine a convergence region that includes the estimated location of the lost device wherein the convergence region is configured to be used to direct a search for the lost device.

10. The system of claim 8, wherein the seek mobile device is further configured to capture exit position data in response to regaining connectivity.

11. The system of claim 8 wherein at least one of the seek device and the server is further configured to determine an exit location of the seek device based on a location signal, in response to regaining connectivity.

12. The system of claim 8, wherein at least one of the seek mobile device and the server are further configured to:
determine a first location based on the first position data;
determine a second location based on the second position data,
wherein the estimated location is related to the first location and the second location.

13. The system of claim 12, wherein at least one of the seek mobile device and the server are further configured to determine a perpendicular bisector of a line connecting the first location and the second location, wherein the estimated location lies on the perpendicular bisector a distance from the line and the distance is determined based on a signal range of the signal from the lost device.

14. A system comprising one or more non-transitory computer readable storage mediums having stored thereon, individually or in combination, instructions that when executed by one or more processors of a seek mobile device result in the following operations comprising: initiating a sensing mode in said seek mobile device in response to receiving an indication that a location of a lost mobile device is unknown; capturing first position data if a signal from the lost device is detected, capturing second position data in response to losing the signal from the lost device; and determining an estimated location of the lost device based on the first position data and the second position data, wherein the lost device is located in an area of limited or no connectivity and the seek device is moving through the area.

15. The system of claim 14, wherein the instructions that when executed by one or more processors results in the following additional operations:
determining a convergence region that includes the estimated location of the lost device wherein the convergence region is configured to be used to direct a search for the lost device.

16. The system of claim 14, wherein the instructions that when executed by one or more processors results in the following additional operations:

capturing exit position data in response to regaining connectivity.

17. The system of claim 14, wherein the instructions that when executed by one or more processors results in the following additional operations:
   determining an exit location of the seek device based on a location signal, in response to regaining connectivity.

18. The system of claim 14, wherein the instructions that when executed by one or more processors results in the following additional operations:
   determining a first location based on the first position data;
   determining a second location based on the second position data,
   wherein the estimated location is related to the first location and the second location.

19. The system of claim 14, wherein the instructions that when executed by one or more processors results in the following additional operations:
   determining a perpendicular bisector of a line connecting the first location and the second location, wherein the estimated location lies on the perpendicular bisector a distance from the line and the distance is determined based on a signal range of the signal from the lost device.

20. The system of claim 14, wherein the position data comprises at least one of time data, heading and change in velocity.

* * * * *